(12) United States Patent
Ni et al.

(10) Patent No.: US 11,927,282 B2
(45) Date of Patent: Mar. 12, 2024

(54) CORRUGATED TUBE FOR BLOWER AND BLOWER

(71) Applicant: MILWAUKEE ELECTRIC TOOL CORPORATION, Brookfield, WI (US)

(72) Inventors: Zu Gen Ni, Suzhou (CN); Xue Fei Ji, Suzhou (CN); Guo Xing Zhang, Dongguan (CN); Sullivan Dee, Milwaukee, WI (US); Robert P. Jensen, Thiensville, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 197 days.

(21) Appl. No.: 17/621,009

(22) PCT Filed: Jun. 26, 2020

(86) PCT No.: PCT/US2020/039814
§ 371 (c)(1),
(2) Date: Dec. 20, 2021

(87) PCT Pub. No.: WO2020/264290
PCT Pub. Date: Dec. 30, 2020

(65) Prior Publication Data
US 2022/0325830 A1    Oct. 13, 2022

(30) Foreign Application Priority Data

Jun. 26, 2019 (CN) .......................... 201920977937.2

(51) Int. Cl.
*F16L 11/15* (2006.01)
*A01G 20/47* (2018.01)

(52) U.S. Cl.
CPC .............. *F16L 11/15* (2013.01); *A01G 20/47* (2018.02)

(58) Field of Classification Search
CPC ........ F16L 11/11; F16L 11/111; F16L 51/025; F16L 11/15; A01G 20/47
(Continued)

(56) References Cited

U.S. PATENT DOCUMENTS 7,147,007 B2 * 12/2006 Renaud .............. B60H 1/00557
138/119
8,549,699 B1 * 10/2013 Domingo ............... A01G 20/47
15/410
(Continued)

FOREIGN PATENT DOCUMENTS

CN        109630773 A    4/2019
DE    102005053390 A1    5/2007
(Continued)

OTHER PUBLICATIONS

International Search Report and Written Opinion for Application No. PCT/US2020/039814 dated Oct. 16, 2020 (10 pages).
(Continued)

*Primary Examiner* — Patrick F Brinson
(74) *Attorney, Agent, or Firm* — Michael Best & Friedrich LLP

(57) ABSTRACT

An outlet tube includes a first rib, a second rib, and a channel positioned between the first rib and the second rib. The first rib extends from a surface of the tube. The first rib tapers between a first thickness and a second thickness. The second rib extends from the surface of the tube. The second rib tapers between the first thickness and the second thickness. The channel has a first width between adjacent first thicknesses and a second width between adjacent second thicknesses. The first width is greater than the second width.

20 Claims, 4 Drawing Sheets

(58) Field of Classification Search
USPC .... 138/119, 121, 122, 173, DIG. 11; 15/405
See application file for complete search history.

(56) References Cited

U.S. PATENT DOCUMENTS

| | | | |
|---|---|---|---|
| 9,627,102 B2* | 4/2017 | Adachi | H01B 7/0045 |
| 2009/0126147 A1* | 5/2009 | Nakazawa | A01G 20/00 |
| | | | 138/119 |
| 2011/0146023 A1* | 6/2011 | Wada | A47L 5/14 |
| | | | 15/327.5 |
| 2015/0113760 A1* | 4/2015 | Fukunaga | H05F 3/025 |
| | | | 15/330 |
| 2015/0237808 A1* | 8/2015 | Prager | E01H 1/0809 |
| | | | 15/405 |
| 2015/0373922 A1* | 12/2015 | Romito | A01G 20/47 |
| | | | 15/405 |
| 2016/0108924 A1* | 4/2016 | Conrad | F04D 25/0673 |
| | | | 417/423.7 |
| 2016/0198636 A1* | 7/2016 | Poole | A01G 20/47 |
| | | | 15/327.5 |
| 2017/0030498 A1* | 2/2017 | Chu | B29C 49/0021 |
| 2018/0243126 A1 | 8/2018 | Porter | |
| 2019/0045725 A1* | 2/2019 | Shangguan | A01G 20/40 |

FOREIGN PATENT DOCUMENTS

| | | |
|---|---|---|
| EP | 2015417 A1 | 1/2009 |
| KR | 100792353 B1 | 1/2008 |
| KR | 1020170056009 A | 5/2017 |
| WO | 9518936 A1 | 7/1995 |
| WO | 2006087608 A2 | 8/2006 |

OTHER PUBLICATIONS

Extended European Search Report for Application No. 20833544.8 dated Mar. 23, 2023 (8 pages).

* cited by examiner

US 11,927,282 B2

CORRUGATED TUBE FOR BLOWER AND BLOWER

CROSS-REFERENCE TO RELATED APPLICATIONS

This application is a national stage filing under 35 U.S.C. § 371 of International Application No. PCT/US2020/039814 filed on Jun. 26, 2020, which claims priority to Chinese Utility Model Application No. 201920977937.2 filed on Jun. 26, 2019, the entire contents of which are incorporated herein by reference.

TECHNICAL FIELD

The present disclosure relates to an outlet tube for a blower and more particularly, to a corrugated tube having different thicknesses. The present disclosure also relates a blower with an outlet tube.

BACKGROUND

A blower is a gardening tool that propels air out of a nozzle to move yard debris such as leaves, twigs, and the like. A typical blower includes a power source, such as an internal combustion or an electric motor, driving a blower-fan that exhausts air under pressure through an outlet tube.

SUMMARY

In a first aspect of the disclosure, there is provided an outlet tube including a first rib, a second rib, and a channel positioned between the first rib and the second rib. The first rib extends from a surface of the tube. The first rib tapers between a first thickness and a second thickness. The second rib extends from the surface of the tube. The second rib tapers between the first thickness and the second thickness. The channel has a first width between adjacent first thicknesses and a second width between adjacent second thicknesses. The first width is greater than the second width.

In a second aspect of the disclosure, there is provided a blower including a main body with an inlet and an outlet. The blower also includes an outlet tube coupled to the main body proximate to the outlet. The outlet tube has a circular cross section and includes a first section and a second section. The second section has a first rib and a second rib. Both the first rib and the second rib taper between a first thickness and a second thickness.

In a third aspect of the disclosure, there is provided a blower including a main body and an outlet tube coupled to the main body. The outlet tube includes a first section and a second section. The first section is movably coupled to the main body. The second section has a first rib and a second rib. Each of the first and second ribs taper between a first thickness and a second thickness. The first rib is movable relative to the second rib in order to move the second section relative to the first section.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a corrugated portion of an outlet tube for a backpack blower. The corrugated tube has ribs, each with a varying thickness of ribbings to allow for different bending motions in different directions.

Figure 1:
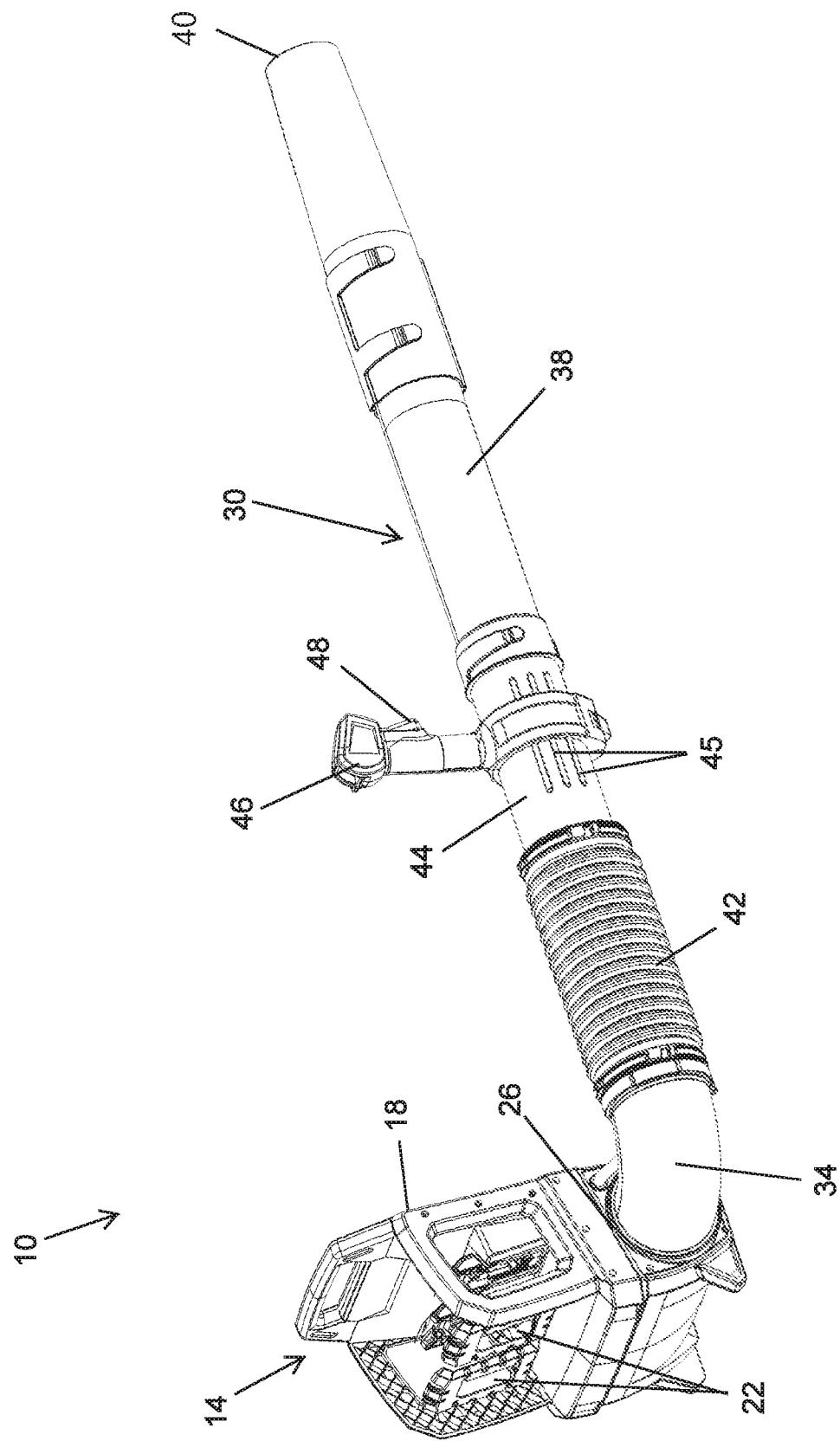
FIG. 1 is a perspective view of a backpack blower in one embodiment of the disclosure.

As shown in FIG. 1, a backpack blower 10 includes a main body 14 with a frame 18. The frame 18 is a substantially flat surface that may be situated against a user's back. Shoulder straps (not shown) may couple to the frame 18 and are worn against the user's back to support the weight of the backpack blower 10. In the illustrated embodiment, batteries (e.g., power tool battery packs) 22 are removably coupled to the main body 14 and provide electrical power to a fan and a motor (neither shown) housed within the main body 14. The motor drives the fan to draw air into the main body 14 through an inlet (not shown), and exhaust air from the main body 14 through an outlet 26. An outlet tube 30 is coupled to the main body 14 proximate the outlet 26 in order to direct the exhausted air.

The outlet tube 30 includes a first section 34, a second section 38, a third section 42, and a fourth section 44. The third and fourth 42, 44 sections are disposed between first and second sections 34, 38. The third section 42 is coupled between the first and fourth sections 34, 44. The fourth section 44 is coupled between the second and third sections 38, 42. The first section 34 is directly coupled to the main body 14, and the second section 38 includes an outlet opening 40. Each section 34, 38, 42, 44 is substantially hollow and provides a flow path for the exhausted air to flow through. The first, second, and fourth sections 34, 38, 44 are rigid members, and the third section 42 is flexible. In the illustrated embodiment, the third section 42 is corrugated. The third section 42 may flex or bend in different directions, and may move the second section 38 relative to the first section 34.

A handle or joystick 46 is coupled to the fourth section 44 of the outlet tube 30, and provides a grip for a user's hand. In the illustrated embodiment, the fourth section 44 includes guides or ridges 45 that allow the joystick to move (e.g., slide) along a length of the fourth section 44. The joystick 46 is electrically coupled to the batteries 22 and the motor. Actuating a button 48 on the joystick 46 provides electrical current to the motor, which drives the fan and produces a stream of air through the main body 14. The handle 46 is also used for positioning and manipulating the outlet tube 30, and thereby directing the outlet opening 40 in a desired direction.

Figure 2:
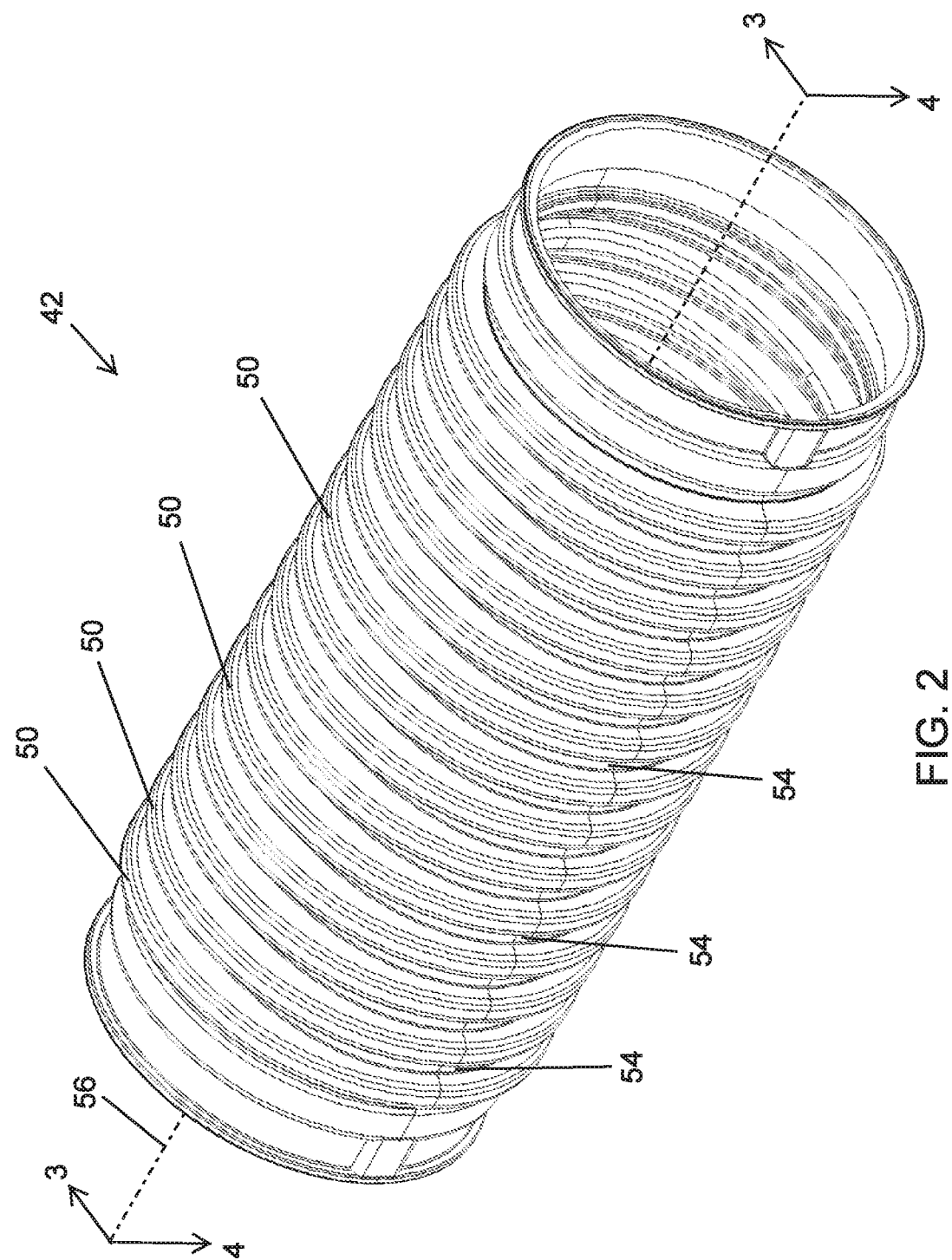
FIG. 2 is a perspective view of a corrugated tube of the backpack blower of FIG. 1.

As shown in FIG. 2, the third section 42 includes ribs 50 and channels 54 between each adjacent rib 50. Each rib 50 may move (e.g., flex or bend) about an axis 56 relative to the other ribs 50 by approximately the width of a channel 54. In the illustrated embodiment, each rib 50 extends around an entire circumference of the third section 42, and defines a circular cross-section (i.e., the rib 50 is substantially the same distance from a center of the third section 42 along the entire circumference). Each rib 50 is identical to the other ribs 50.

Figure 3:
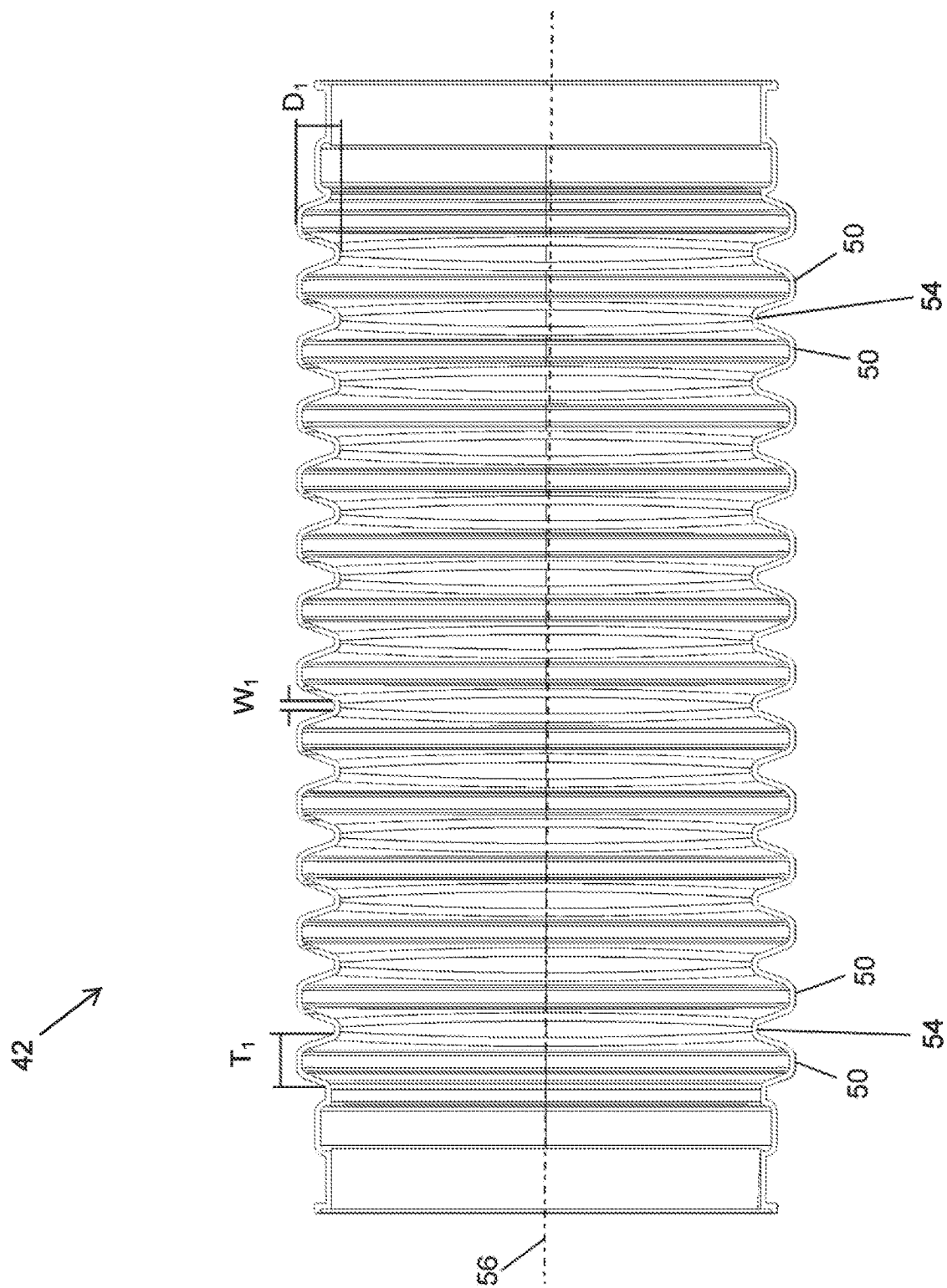
FIG. 3 is a cross-sectional view of the corrugated tube of FIG. 2, viewed along line 3-3 of FIG. 2.

As shown in FIG. 3, each rib 50 includes a first thickness $T_1$, and each channel 54 includes a first width $W_1$. Each rib 50 also includes a first depth $D_1$, measured from a top of one rib 50 to a bottom of an adjacent channel 54. In the illustrated embodiment, the first thickness $T_1$, the first width $W_1$, and the first depth $D_1$ are the same for every rib 50 on opposing sides (e.g., a top and a bottom 180° apart) of the third section 42.

Figure 4:
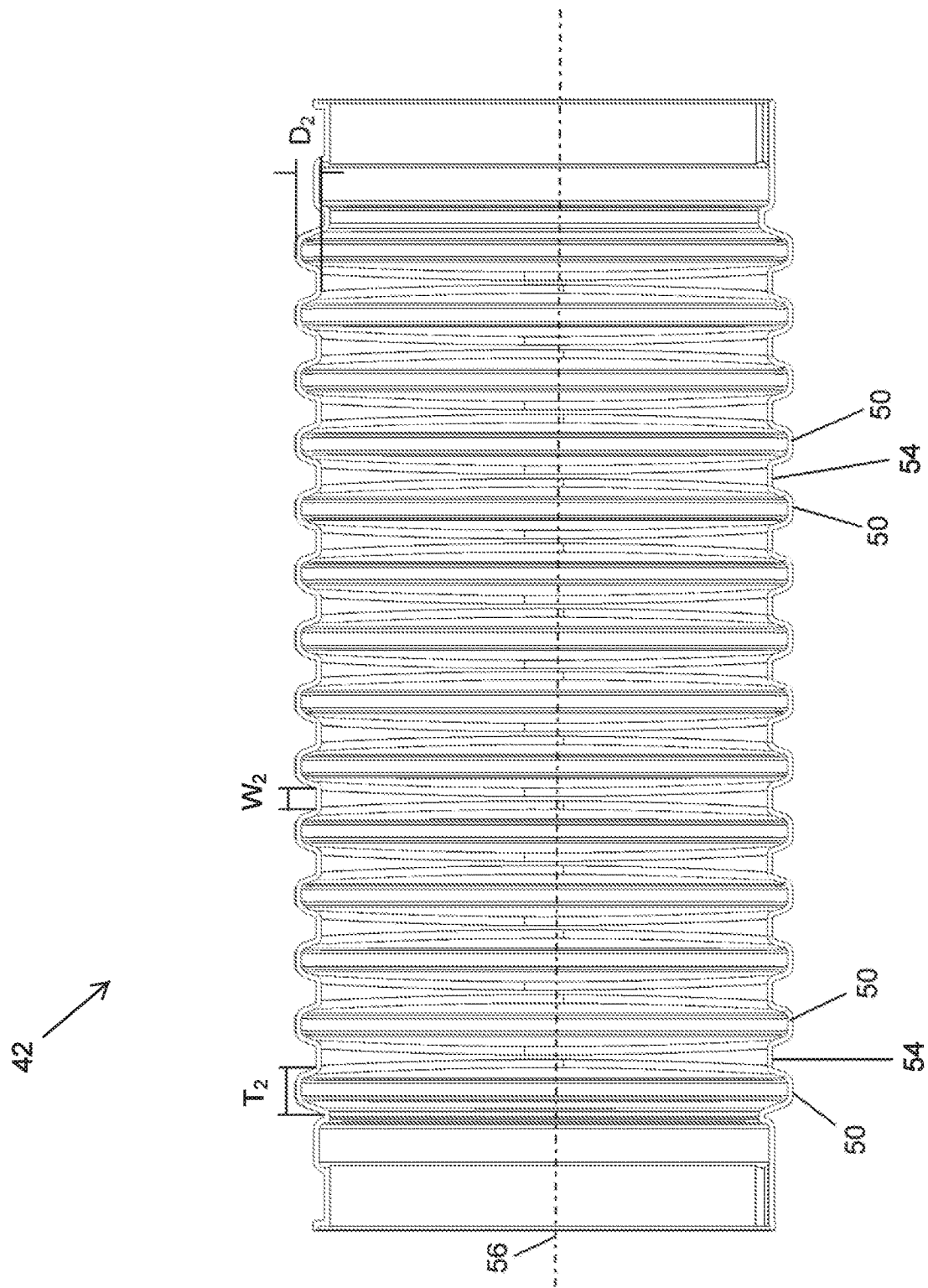
FIG. 4 is a cross-sectional view of the corrugated tube of FIG. 2, viewed along line 4-4 of FIG. 2.

As shown in FIG. 4, each rib 50 also includes a second thickness $T_2$, and each channel 54 also includes a second width $W_2$. Each rib 50 also includes a second depth $D_2$, measured from the top of one rib 50 to a bottom of an adjacent channel 54. In the illustrated embodiment, the second thickness $T_2$, the second width $W_2$, and the second depth $D_2$ are the same for every rib 50 on opposing sides (e.g., a left side and a right side 180° apart) of the third section 42. The second thickness $T_2$, the second width $W_2$, and the second depth $D_2$ are also approximately orthogonal with respect to the first thickness $T_1$, the first width $W_1$, and the first depth $D_1$.

As shown in FIGS. 3 and 4, the first thicknesses $T_1$ of the ribs 50 are aligned with one another and the second thicknesses $T_2$ of the ribs 50 are aligned with one other. The first thickness $T_1$ is greater than the second thickness $T_2$, and the ribs 50 taper between the first and second thicknesses $T_1$, $T_2$. In other words, a portion of the ribs 50 on the top and bottom of the third section 42 is thicker than a portion of the ribs 50 on the left and right sides of the third section 42. The second width $W_2$ is also greater than the first width $W_1$. The channels 54 (i.e., the space between adjacent ribs 50) are narrower on the top and bottom of the third section 42 than on the left and right sides in order to provide space for the increased thickness (e.g., the third section 42 has an elliptical cross-section). Additionally, the first depth $D_1$ is greater than the second depth $D_2$. Surfaces of the channels 54 on the top and bottom are disposed closer to a center of the third section 42 than surfaces of the channels 54 on the left and right sides. This allows for the same angle between an upper surface of the ribs 50 and the channel 54 along the entire circumference of the third section 42, while also allowing the rib 50 to have a varying thickness around a circumference of the tube 30.

The third section 42 may move in a given direction (e.g., a first direction, a second direction, a third direction, or a fourth direction) based on the thickness of the ribs 50 and the width of the channel 54. The first and second directions are opposite one another (e.g., up and down) and the third and fourth directions are opposite one another (e.g., left and right). The first, second, third, and fourth directions may also be orthogonal with respect to axis 56 of the tube 30. The larger first thickness $T_1$ and smaller first width $W_1$ along the upper and lower sides of the third section 42 allows for less movement in the first and second directions than is allowed in the third and fourth directions (i.e., where the second thickness $T_2$ is smaller and the second width $W_2$ is larger). In other words, more movement of the third section 42 is possible in the third and fourth directions (i.e., left-right direction as shown in the figures) than in the first and second directions (i.e., up-down direction as shown in the figures). The third section 42 may also move in an infinite number of directions between the adjacent first, second, third, and fourth directions (e.g., the third section 42 may move in a direction between the first and third directions). The amount of movement permitted by the ribs 50 in a direction between two orthogonal directions (e.g., between the first and third directions) is greater than the amount of movement permitted in the first and second directions, but less than the amount of movement permitted in the third and fourth directions.

When using the backpack blower 10, the user may move the joystick 46 in order to move the second section 38 of the outlet tube 30 and change the direction of the exhausted air (e.g., to change where debris is blown) out of the outlet opening 40. The larger second width $W_2$ of the channels 54 along the sides of the third section 42 allow a user to make larger adjustments to a blowout direction (i.e., direction of the exhausted air) in a horizontal direction than in a vertical direction. A rib 50 can continue to move relative to the other ribs 50 until it contacts an adjacent rib 50. The larger width $W_2$ means that there is more space between adjacent ribs 50, which allows for more movement.

When a user releases the joystick 46 (i.e., and no longer supports the outlet tube 30), gravity moves the outlet tube 30 toward the ground. The smaller first width $W_1$ allows for minimal movement in the vertical direction. This keeps the second and third sections 38, 42 of the outlet tube 30 from contacting the ground when the user is no longer holding the joystick 46 and opposing the force of gravity. In the illustrated embodiment, the first section 34 is rotatably coupled to the main body 14, and can rotate to make larger adjustments to the vertical component of the blowout direction.

The embodiment(s) described above and illustrated in the figures are presented by way of example only and are not intended as a limitation upon the concepts and principles of the present disclosure. As such, it will be appreciated that variations and modifications to the elements and their configurations and/or arrangement exist within the spirit and scope of one or more independent aspects as described.

The invention claimed is:

1. A corrugated tube for a blower, comprising:
   a first rib extending from a surface of the corrugated tube, the first rib extending around an entire circumference of the corrugated tube and defining a circular cross-section, the first rib tapering between a first thickness and a second thickness;
   a second rib extending from the surface of the corrugated tube and being spaced apart from the first rib, the second rib extending around the entire circumference of the corrugated tube and defining a circular cross-section, the second rib tapering between the first thickness and the second thickness, the first thickness of the first and second ribs being aligned with one another and the second thickness of the first and second ribs being aligned with one another; and
   a channel positioned between the first rib and the second rib and defining an elliptical cross-section about the corrugated tube, the channel having a first width between adjacent first thicknesses and a second width between adjacent second thicknesses, the first width being less than the second width.

2. The corrugated tube of claim 1, wherein the first width is orthogonal with respect to the second width.

3. The corrugated tube of claim 1, wherein the first rib is bendable in a first direction relative to the second rib a first distance about the first width of the channel, and is bendable a second distance about the second width of the channel in a second direction, the first distance being less than the second distance.

4. The corrugated tube of claim 1, wherein the first rib has a first depth measured from a top of the first rib to the channel proximate the first width and a second depth measured from the top of the first rib to the channel proximate the second width, the first depth being greater than the second depth.

5. The corrugated tube of claim 1, wherein the first rib and the second rib are two of a plurality of ribs, all of which are identical to one another.

6. The corrugated tube of claim 1, wherein the first rib is bendable relative to the second rib about the channel in an infinite number of radial directions.

7. A blower comprising:
a main body having an inlet and an outlet; and
an outlet tube coupled to the main body proximate the outlet, the outlet tube having a circular cross section and including
a first section, and
a second section having a first rib, a second rib, and a channel positioned between the first rib and the second rib, each of the first rib and the second rib tapering between a first thickness at first diametrically opposed circumferential locations of the outlet tube and a second thickness at second diametrically opposed circumferential locations of the outlet tube, each of the first and second ribs having a varying thickness around a circumference of the outlet tube, the first and second ribs having an identical angle between a top of a respective rib and the channel along the entire circumference.

8. The blower of claim 7, further comprising a battery removably coupled to the main body.

9. The blower of claim 7, further comprising the channel having a first width between adjacent first thicknesses and a second width between adjacent second thicknesses, the first width being less than the second width.

10. The blower of claim 9, wherein the first rib is bendable relative to the second rib a first distance about the first width of the channel in a first direction, and a second distance about the second width of the channel in a second direction, the first distance being less than the second distance.

11. The blower of claim 7, wherein the first thickness of the first rib is aligned with the first thickness of the second rib, and the second thickness of the first rib is aligned with the second thickness of the second rib, and wherein the first thicknesses are spaced 90° apart from the second thicknesses.

12. The blower of claim 7, wherein the first section is moveable relative to the main body and the second section is moveable relative to the first section.

13. The blower of claim 7, wherein the outlet tube further comprises a third section including a tube outlet, the third section coupled between the first and second section, and the third section movable with the second section relative to the first section in order to change a direction of the tube outlet.

14. A blower comprising:
a main body; and
an outlet tube coupled to the main body, the outlet tube including
a first section movably coupled to the main body, and
a second section having a first rib and a second rib, each of the first rib and the second rib tapering circumferentially about a central longitudinal axis of the outlet tube between a first thickness and a second thickness, each of the first rib and the second rib extending a constant radial distance from the central longitudinal axis, the first rib movable relative to the second rib in order to move the second section relative to the first section, the outlet tube movable in a first pair of opposite directions, and the outlet tube movable in a second pair of opposite directions, the first pair of opposite directions being orthogonal to the second pair of opposite directions, and wherein the second section allows for less movement in the first pair of opposite directions than is allowed in the second pair of opposite directions.

15. The blower of claim 14, further comprising a battery removably coupled to the main body.

16. The blower of claim 14, further comprising a channel positioned between the first rib and the second rib, the channel having a first width between adjacent first thicknesses and a second width between adjacent second thicknesses, the first width being less than the second width.

17. The blower of claim 16, wherein the first rib is bendable relative to the second rib a first distance about the first width of the channel in a first direction, and a second distance about the second width of the channel in a second direction, the first distance being less than the second distance, and the first section being movable in the first direction a third distance that is greater than the first distance.

18. The blower of claim 14, wherein the first thickness is orthogonal with respect to the second thickness.

19. The blower of claim 14, wherein the first rib has a first depth measured from a top of the first rib to a channel between the first and second ribs and a second depth measured from the top of the first rib to the channel, the first depth is proximate the first thickness and the second depth is proximate the second thickness, the first depth is greater than the second depth.

20. The blower of claim 14, wherein the first rib is bendable relative to the second rib about the channel in an infinite number of radial directions.

\* \* \* \* \*